J. A. MILLER.
WINDSHIELD.
APPLICATION FILED NOV. 24, 1919.

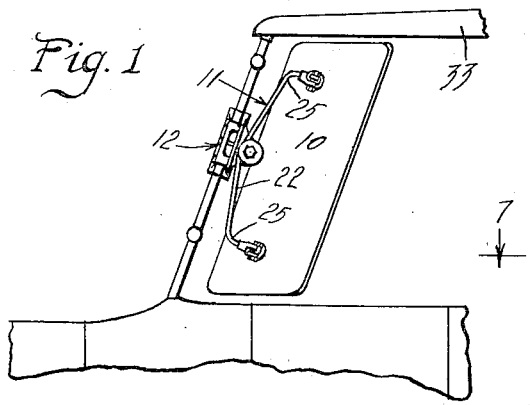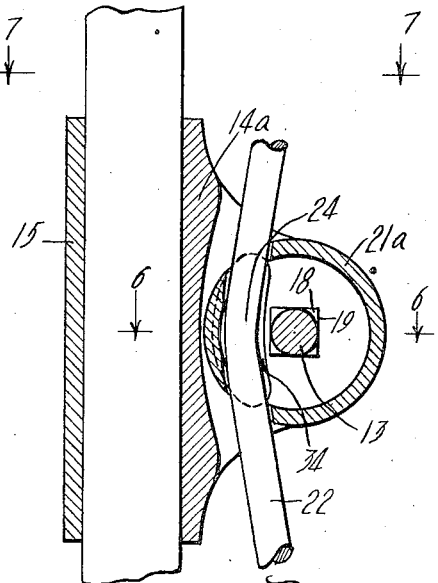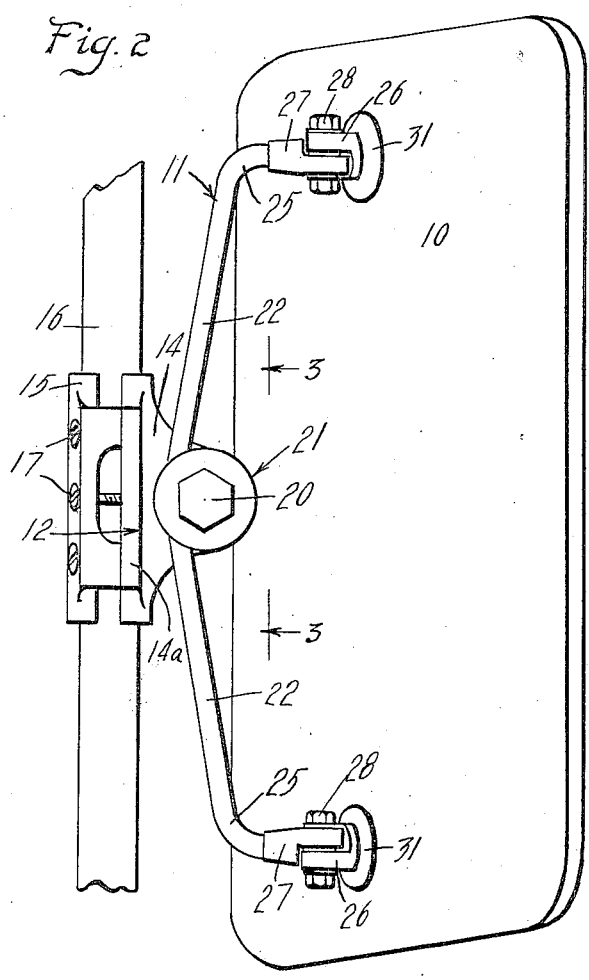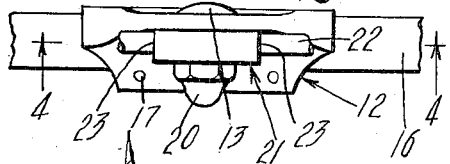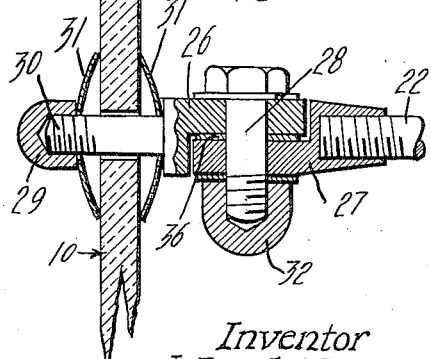
Inventor
John A. Miller
by
his Attorney

1,371,703.

Patented Mar. 15, 1921.
2 SHEETS—SHEET 2.

Inventor
John A. Miller
by
James T. Barkelew
his Attorney.

UNITED STATES PATENT OFFICE.

JOHN A. MILLER, OF LOS ANGELES, CALIFORNIA.

WINDSHIELD.

1,371,703. Specification of Letters Patent. Patented Mar. 15, 1921.

Application filed November 24, 1919. Serial No. 340,123.

*To all whom it may concern:*

Be it known that I, JOHN A. MILLER, a citizen of the United States, residing at Los Angeles, in the county of Los Angeles, State of California, have invented new and useful Improvements in Windshields, of which the following is a specification.

The present invention relates to windshields and especially to windshields which may be used in connection with the front windshield of an automobile. It is an object of the present invention to provide a windshield which is sightly, adjustable, simple in construction and which will effectively deflect rain and wind from the occupants of the automobile. This invention is an improvement upon the type of windshield shown in my application S. N. 283,894 filed March 20th, 1919.

A further object of my invention is to provide a windshield that may be easily and quickly adjusted to any type of front windshield. This windshield may be quickly adjusted to any angle of adjustment in a vertical plane, as well as raised and lowered to any desired position. My device has very few parts and is sightly and does not obstruct the occupants' view. It is also an object of my invention to provide a side windshield which may be adjusted to coincide with the longitudinal lines of the machine and angle of the windshield. Heretofore windshields have been constructed to provide only for the adjustment to any desired horizontal angle but have not achieved the possibility of adjustment relative to the angle of the windshield.

Further objects of the invention and details of construction will be readily understood from the following detailed description of a specific preferred form of invention, reference being had to the accompanying drawings, in which—

Figure 6:
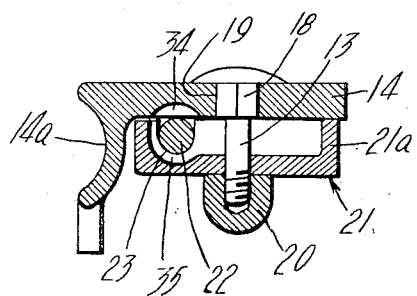
Figure 7:
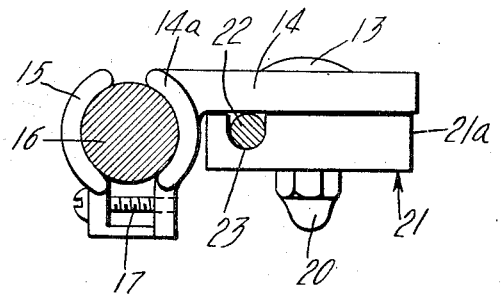

Figure 1 is a side elevation showing one of my side windshields in a position attached to a sloping front windshield; Fig. 2 in an enlarged view showing the side windshield attached to a vertical windshield; Fig. 3 is a reduced view taken as indicated by line 3—3 on Fig. 2; Fig. 4 is an enlarged section of the clamp; Fig. 5 is an enlarged section through the connection of the windshield frame to the glass; Fig. 6 is a section taken as indicated by line 6—6 on Fig. 4; and Fig. 7 is a view taken as indicated by line 7—7 on Fig. 4.

Throughout the drawings numeral 10 designates the body of the windshield which may be made of glass or any similar transparent material. The body 10 is supported by frame 11 which comprises a rod or bar 22 and swivel brackets which will be hereinafter explained. The rod 22 is attached to the front windshield of the machine by means of clamp 12 which may be attached to the main windshield at any desired height and position. It is also possible to adjust the glass 10 relative to the angle of the windshield; that is to say, the glass may be made parallel to or at an angle with the windshield standard. This will hereinafter be described in detail.

The clamp may be made in any suitable configuration. For instance, it may comprise two clamp halves 14ª and 15. Clamp half 14ª carries bracket 14. The clamp is fastened to the standard 16 by means of screws 17 which draw the clamp halves together. The clamp halves are so shaped as to grip the standard 16 firmly.

Rod 22 is held between bracket 14 and clamping jaw 21. A bolt 13 passes through the parts 14 and 21, being squared at 18 to prevent rotation; and a nut 20 on its outer end presses jaw 21 toward bracket 14 and thus holds rod 22 between those parts. Jaw 21 is cup shaped and its flange 21ª has two notches 23 to hold the rod 22. Jaw 21 may be rotated about the bolt 13 to adjust the longitudinal angle of rod 22. Jaw 21 is not, in practice, clamped too tightly around rod 22 but holds it loosely enough so as to allow it to turn in the clamp for adjusting the horizontal angle of the glass. In the casting 14 I provide a concaved portion 34 and in the jaw 21 a concaved portion 35 which runs between notches 23 and allows swinging of rod 22. These depressions 34 and 35 permit sufficient clearance for the curvature 24 of rod 22 when the rod is turned to a position at right angles to that shown. After the desired adjustment has been made the nut 20 may be tightened. The rod 22 may be made in any configuration. I show a bent rod; but this is not necessary as the rod may be made straight. The bent rod allows the upper or lower edge of the glass to be adjusted somewhat closer to the front windshield than does a straight rod whose curves at 25 would be farther from the glass than in the case illustrated. These curvatures allow a larger range of adjustments as the body 10 may be swung through a larger arc around bolt 13 as a center before striking the windshield standard.

Adjustment around bolt 13 as a center is important as it allows the vertical edges of the windshield to be adjusted parallel with the angle of the automobile windshield standard. The adjustments make any shape of glass applicable to any machine without cutting or re-shaping the glass as the angle may be made suitable by adjusting the rod 22 in clamp 12. The horizontal edges of glass 10 are preferably cut to be parallel with the top 33, of the machine, when the side windshield is parallel to the angle of the windshield standard. This adjustment also allows the side windshield to be set in any desired position to deflect wind upwardly or downwardly, as well as outwardly or inwardly.

Rod 22 is attached at its ends to glass 10, where it is pivotally connected to the glass. The rod 22 is secured to the glass or body 10 by means of bracket 26 which is pivotally connected to casting 27 by bolt 28. Casting 27 is screw-threadedly engaged to the ends of rod 22. Friction washer 36 is provided between bracket 26 and casting 27 which tends to firmly hold the adjustment. The glass or body 10 is held on bracket 26 by means of stud 30 which together with nut 29 furnish clamping means for the glass. Spring metal washers 31 are provided which are spherical in shape, having bores slightly larger than stud 30. These washers clamp the glass on a large surface and do not in any way bind or strain the glass. After the desired adjustment has been made the nuts 32 are tightened on bolts 28 so as to hold the bracket firmly against wind pressure but loose enough to allow adjustment by hand pressure. This feature of my construction is the subject matter of my application above referred to, and need not be further described in detail here.

I do not wish to limit myself to the above specific details, but wish to reserve to myself any changes or modifications which may appear to those skilled in the art. I wish to herewith claim the following.

Having described a preferred form of my invention, I claim:

1. In a device of the character described, the combination of a shield member, a supporting frame for the shield member embodying a bent rod, adjustable supporting means for the rod embodying a single annular jaw, said jaw having a seat for the rod and being pivotally adjustable about a horizontal axis, whereby said shield may be adjusted vertically and pivotally and held in adjusted position by the single jaw.

2. In a device of the character described, the combination of a shield member, a supporting frame for said shield member embodying a bent rod, a bracket, a horizontal pivot bolt on said bracket, a cap-shaped jaw mounted on said bolt and rotatably adjustable in position thereon, the flange of said jaw having notches to receive said rod and clamp the same between the jaw and the bracket whereby said shield may be adjusted vertically and pivotally and held in adjusted position by the single jaw.

In witness that I claim the foregoing I have hereunto subscribed my name this 5th day of November, 1919.

JOHN A. MILLER.

Witness:
VIRGINIA BERINGER.